United States Patent [19]

Doi et al.

[11] Patent Number: 4,878,820
[45] Date of Patent: Nov. 7, 1989

[54] SCREW COMPRESSOR

[75] Inventors: Motomichi Doi, Katsuta; Minetoshi Izushi, Shimizu; Kazuhiko Kawaike, Katsuta; Masayuki Urashin, Shimizu, all of Japan

[73] Assignee: Hitachi, Ltd., Tokyo, Japan

[21] Appl. No.: 194,917

[22] Filed: May 17, 1988

[30] Foreign Application Priority Data

May 22, 1987 [JP]  Japan ................................ 62-123645

[51] Int. Cl.$^4$ ............................................. F04C 18/16
[52] U.S. Cl. ................................... 418/203; 384/322; 384/399
[58] Field of Search ...................... 418/203, 98, 201 R; 184/6.16, 6.18; 384/322, 397, 398, 399, 415

[56]  References Cited

U.S. PATENT DOCUMENTS

| Re. 32,055 | 12/1985 | Schibbye et al. | 418/203 |
|---|---|---|---|
| 978,087 | 12/1910 | Weinland et al. | 384/399 |
| 3,236,079 | 5/1973 | Kantz | 184/6.16 |
| 3,685,617 | 8/1972 | Gardner | 184/6.16 |
| 3,796,526 | 3/1974 | Cawley | 418/201 R |
| 3,811,805 | 5/1974 | Moody, Jr. et al. | 418/203 |
| 3,895,689 | 7/1975 | Sweanngen | 184/6.16 |
| 3,922,114 | 11/1975 | Hamilton et al. | 184/6.16 |
| 4,215,903 | 8/1980 | Andrews | 384/399 |
| 4,455,098 | 6/1984 | Pollock | 384/415 |
| 4,478,054 | 10/1984 | Shaw et al. | 418/98 |

Primary Examiner—Carlton R. Croyle
Assistant Examiner—Timothy S. Thorpe
Attorney, Agent, or Firm—Antonelli, Terry & Wands

[57]  ABSTRACT

A screw compressor comprises a casing and a pair of male and female rotors respectively having herical teeth and grooves formed in their outer peripheries. The rotors are arranged within the casing in meshing relation to each other through the teeth and grooves. Each rotor is rotatably supported by a pair of first and second radial plain bearings and a thrust plain bearing which is arranged at an end of the rotor shaft and adjacent the second radial plain bearing. Each of the thrust plain bearings is of dynamic-pressure type in which with rotation of a corresponding one of the shafts of the respective rotors, pressure is applied to lubricant by sliding movement of the thrust plain bearing to produce an anti-thrust force. The lubricant for each of the second radial plain bearings and for a corresponding one of the thrust plain bearings is fed to a space between the second radial plain bearing and the thrust plain bearing, and is distributed to the second radial plain bearing more in amount than that fed to the thrust bearing due to a difference between flow resistance with which the lubricant passes through the second radial plain bearing and flow resistance with which the lubricant passes through the thrust plain bearing.

12 Claims, 4 Drawing Sheets

SCREW COMPRESSOR

BACKGROUND OF THE INVENTION

The present invention relates to an improvement in bearings for use in a screw compressor.

In general, the arrangement of a screw compressor is such that a pair of male and female rotors rotate in meshing relation to each other through teeth and grooves to compress gas such as refrigerant gas or the like. Because of such arrangement, large force acts upon the rotors, and the rotors are required to rotate at a high speed. The screw compressor is provided with radial bearings for supporting radial force from the rotors and thrust bearings for supporting axial force from the rotors.

Conventionally, angular-contact rolling bearings have been employed for the purposes described above, and have been arranged in plural to increase the load capacity. As a result, the bearings occupy much space so that the entire compressor tends to be brought to a large size. In addition, in a hermetic screw compressor, a semipermanent service life is required for each bearing. The rolling bearing is advantageous in that it is hard to seize up even under inferior lubricating conditions. However, the rolling bearing have a relatively short service life because of rolling fatigue.

Screw compressors employing rolling bearings are described, for example, in Japanese Patent Application Laid-Open Nos. 57-119191 and 57-206791.

In order to solve the problems discussed above, it is desirable that slide bearings or plain bearings are employed as a substitute for the screw compressor in rolling bearings. The plain bearing is advantageous in that the structure is compact, the cost is low, the service life can be prolonged, and the like. On the other hand, the plain bearing is subject to seizing and becomes unable to rotate, if formation of a lubricating oil film is insufficient.

Gas within the screw compressor is brought to a high temperature level in the course of compression of the gas, so that the lubricating oil often reaches a temperature level within a range of from 130 to 140 degrees C. Further, the lubricating oil is mixed with the compressed gas such as refrigerant or the like and tends to be reduced in viscosity, and the load applied to the bearings is high. In particular, if plain bearings are employed in a low-capacity hermetic screw compressor which utilizes a differential-pressure oil supply system, some of the plain bearings would seize up in a moment unless a sufficient amount of lubricating oil is fed to all of the plurality of bearings.

Japanese Patent Application Laid-Open No. 56-9694 discusses problems concerning the plain bearing lubrication in a screw compressor employing the differential-pressure oil supply system, and has proposed one solution to of the problems. According to this prior art, the lubricating oil is fed to a substantially central portion of each of two radial bearings for each of two rotor shafts. At the same time, in order to secure lubrication of each thrust bearing for the rotor shaft, the lubricating oil is supplied to a hydraulic pressure chamber defined between each thrust bearing and the adjacent radial bearing, through a passageway having provided therein a restriction, and the lubricating oil is fed from the hydraulic pressure chamber to the thrust bearing.

The solution proposed in the above prior art can get considerable results. If consideration is made to the inferior lubricating conditions as described above, however, it is desirable to further enhance the lubricating ability, in particular, of the thrust bearings. A plain bearing of dynamic-pressure type in which pressure is applied to the lubricating oil at a sliding section is superior in the ability of forming an oil film, and is effective for this purpose. However, supply of the lubricating oil according to the aforesaid prior art is inadequate for the case of employment of dynamic-pressure type thrust bearings, since supply of the lubricating oil to each thrust bearing and supply of the lubricating oil to the radial bearings are brought to an extremely unbalanced state.

That is, in case where the dynamic-pressure type thrust bearings are employed in a screw compressor and the lubricating-oil supply means as disclosed in Japanese Patent Application Laid-Open No. 56-9694 an amount of the lubricating oil passing through each thrust plain bearing is low, because the resistance to flow of the lubricating oil through the thrust plain bearing is high. On the other hand, the path guiding the lubricating oil to the central portion of the radial plain bearing adjacent to each thrust plain bearing is low in flow resistance. Accordingly, the lubricating oil almost does not flow to a section of the radial plain bearing on the side of the thrust bearing, but only a section of the radial plain bearing on the side opposite to the thrust bearing is lubricated. For this reason, the section of the radial plain bearing on the side of the thrust bearing seizes in a short period of time.

SUMMARY OF THE INVENTION

It is an object of the invention to provide a screw compressor in which the seizure-resistant ability of plain bearings is improved, the structure is compact, and the service life of the bearings is long.

To this end, the invention employs dynamic-pressure type plain bearings as thrust bearings for the screw compressor, and conversely utilizes an imbalance in flow resistance between the dynamic-pressure type plain bearings and radial plain bearings to thereby improve the lubricating ability of the entire plain bearings.

According to the invention, there is provided a screw compressor comprising a casing, a pair of male and female rotors respectively formed in outer peripheries thereof with helical teeth and grooves, with the male and female rotors being arranged within the casing in meshing relation to each other through the teeth and grooves, two pairs of first and second radial plain bearings for respectively supporting shafts of the male and female rotors, and a pair of thrust plain bearings arranged respectively adjacent the second radial plain bearings for supporting one ends of the shafts of the male and female rotors. Each of the thrust plain bearings is of dynamic-pressure type in which with rotation of a corresponding one of the shafts of the male and female rotors, pressure is applied to lubricant at a sliding section of the thrust plain bearing to produce an anti-thrust force, and the lubricant is fed to each of the first radial plain bearings, and is fed to a space between an end of a sliding section of each of the second radial plain bearings and an adjacent end of the sliding section of a corresponding one of the thrust plain bearings so that the lubricant is distributed to the second radial plain bearing and the thrust bearing to lubricate these bearings in proportion to a difference between flow resistance with which the lubricant passes through the second radial plain bearing and flow resistance with which the lubricant passes through the thrust plain bearing.

In the above arrangement, the lubricant fed to the space between each second radial plain bearing and a corresponding one of the thrust plain bearings flows in part to the thrust plain bearing, and the remaining lubricant flows from one end to the other end of the second radial plain bearing to lubricate its entire axial length. A requisite amount of lubricant for lubricating each thrust plain bearing is determined depending upon rotational speed of a corresponding one of the rotors and compressing conditions. Since, however, each thrust plain bearing is of dynamic-pressure type, a thick lubricant film is formed with a less amount of the lubricant, at the sliding section of the thrust plain bearing, making it possible to prevent seizing-up of the thrust plain bearing.

On the other hand, since each radial plain bearing is lubricated by the remaining rich amount of lubricant, the radial plain bearing is prevented from seizing up even under a wide range of operating conditions of the screw compressor so that the radial plain bearing operates in a stable fashion.

DETAILED DESCRIPTION OF THE EMBODIMENTS

The invention will be described below in detail with reference to embodiments illustrated in the accompanying drawings.

Figure 1:
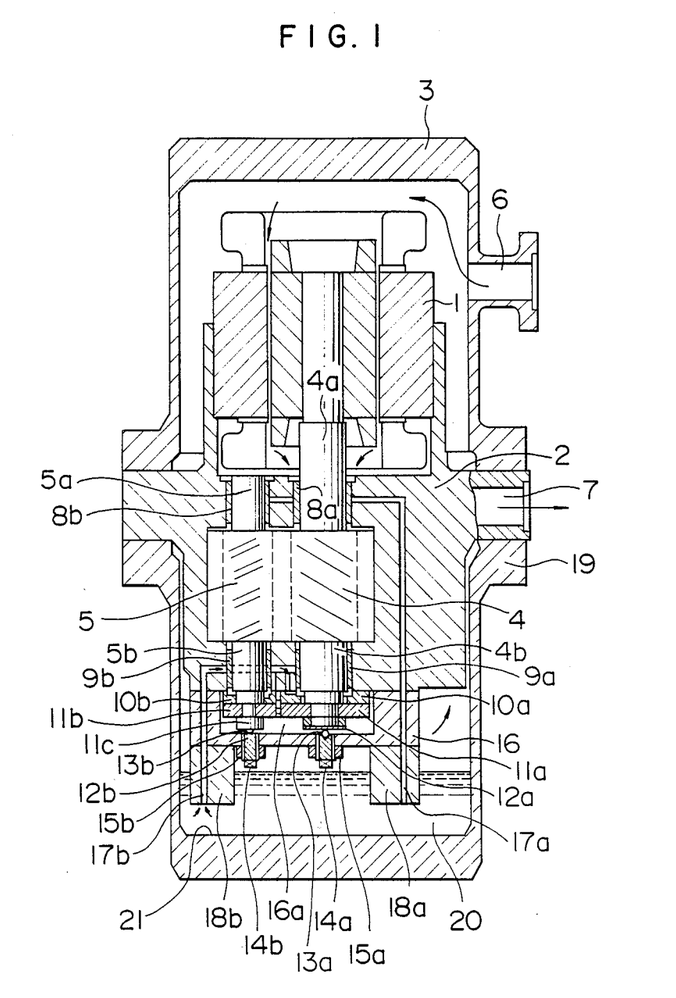
FIG. 1 is a longitudinal cross-sectional view of a screw compressor according to an embodiment of the invention.

Referring to FIG. 1, a screw compressor according to an embodiment of the invention comprises a tubular rotor casing 2 and an electric motor 1 mounted to an upper end of the rotor casing 2. A cup-shaped suction casing 3 is gas-tightly mounted to the rotor casing 2 by bolts or the like to cover the electric motor 1.

A pair of male and female rotors 4 and 5 are rotatably accommodated in the rotor casing 2. The male and female rotors 4 and 5 are respectively formed in their outer peripheral surfaces with helical teeth and grooves. The rotors 4 and 5 are arranged in meshing relation to each other through the teeth and grooves. A suction inlet 6 is provided in the suction casing 3. Gas, compressed as refrigerant or the like passing through the suction inlet 6, is introduced into the mating section between the male and female rotors 4 and 5 through the electric motor 1. A discharge outlet 7 is provided in the rotor casing 2 in communication with the mating section between the male and female rotors 4 and 5 to permit the compressed gas to be discharged through the discharge outlet 7.

The male and female rotors 4 and 5 have their respective one shafts 4a and 5a which are supported respectively by radial plain bearings 8a and 8b arranged in the rotor casing 2. The shaft 4a is connected to the electric motor 1. The male and female rotors 4 and 5 have their respective other shafts 4b and 5b which are supported respectively by radial plain bearings 9a and 9b mounted also to the rotor casing 2. A pair of thrust plain bearings are arranged respectively at ends of the respective shafts 4b and 5b for receiving axial forces acting upon the respective male and female rotors 4 and 5.

Figure 2:
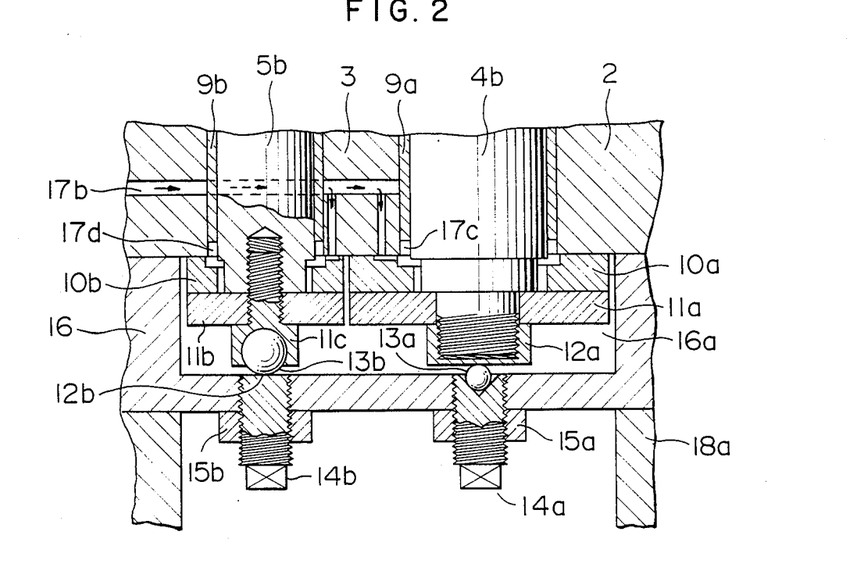
FIG. 2 is an enlarged cross-sectional view of the neighborhood of thrust plain bearings of the screw compressor illustrated in FIG. 1.

As shown in FIG. 2 in an enlarged fashion, each of the thrust plain bearings is composed of a disc-like runner 11a, 11b fixedly mounted to a corresponding one of the shafts 4b and 5b of the respective male and female rotors 4 and 5, and a disc-like stationary bearing element 10a, 10b arranged in facing relation to the runner 11a, 11b. Each of the stationary bearing elements 10a and 10b is formed therein with a through bore. The stationary bearing elements 10a and 10b are fixedly mounted to the rotor casing 2 and are arranged respectively above the runners 11a and 11b in such a manner that the shafts 4b and 5b of the respective rotors extend respectively through the through bores in the respective stationary bearing elements 10a and 10b. As the screw compressor operates, the male and female rotors 4 and 5 are moved upwardly under the reaction from compression of the gas to cause the runners 11a and 11b to be urged respectively against the stationary bearing elements 10a and 10b.

A planar element 12a and a ball element 13a are arranged at the shaft end of the male rotor 4 in a close relation to the thrust plain bearing therefor. Likewise, a planar element 12b and a ball element 13b are arranged at the shaft end of the female rotor 5 in a close relation to the thrust plain bearing therefor. The planar element 12a is in the form of a cup and is threadedly engaged with the shaft end of the male rotor 4. The planar element 12b is formed by one end of a positioning bolt 14b which is mounted to a bottom of a cover plate 16 by a lock nut 15b, with the planar element 12b facing toward the shaft end of the female rotor 5. The cover plate 16 is fixedly mounted in a gas-tight fashion to a lower face of the rotor casing 2 so as to cover the shaft ends of the respective male and female rotors 4 and 5. Threadedly engaged with the shaft end of the female rotor 5 is a runner retainer 11c in the form of a bolt which is arranged in facing relation to the positioning bolt 14b. The runner retainer 11c has a lower end face formed with a recess. The ball element 13b is received in the recess and is in contact with the planar element 12b.

Also at a position below the planar element 12a on the side of the male rotor 4, a positioning bolt 14a is mounted to the bottom of the cover plate 16 by a lock nut 15a in facing relation to the planar element 12a. The ball element 13a is received in a recess formed in a head of the positioning bolt 14a, and is in contact with a lower surface of the planar element 12a. The planar elements 12a and 12b and the ball elements 13a and 13b rotatably support the male and female rotors 4 and 5 when the reaction force acting upon each of the rotors due to the compressed gas is lower than the weight of the rotor, at start-up or at stopping of the screw compressor.

A cup-shaped high-pressure gas casing 19 is gastightly mounted to the lower portion of the rotor casing 2 by means of bolts or the like. The high-pressure casing 19 cooperates with the suction casing 3 to form a pressure vessel. The high-pressure casing 19 has an interior thereof serving as an oil reservoir 21 in which the lubricating oil 20 is stored. On the other hand, a pair of strainers 18a and 18b are attached to the lower end of the cover casing 16, and have their respective lower ends immersed in the lubricating oil 20.

A pair of feed-oil bores 17a and 17b are formed which extend through the respective strainers 18a and 18b, the cover casing 16 and the rotor casing 2. The feed-oil bore 17a connects the oil reservoir 21 to the radial plain bearings 8a and 8b on the suction side, while the feed-oil bore 17b connects the oil reservoir 21 to a pair of spaces or hydraulic pressure chambers 17c and 17d (see FIG. 2) between the respective radial plain bearings 9a and 9b on the discharge side and the respective thrust plain bearings.

In operation of the screw compressor according to the illustrated embodiment, as the electric motor 1 is turned on, the rotors 4 and 5 are rotatively driven by the electric motor 1. As indicated by the arrows in FIG. 1, the gas flowing into the suction casing 3 through the suction inlet 6 passes through the electric motor 1 while cooling the same. The gas is drawn into the mating section between the rotors 4 and 5 through a suction port (not shown) provided in the rotor casing 2 and is compressed by the rotors 4 and 5. The compressed gas is discharged to the interior of the high-pressure casing 19 through a discharge port (not shown) provided in the rotor casing 2. Subsequently, the compressed gas passes through an oil separator (not shown) and flows out of the compressor through the discharge outlet 7.

As the screw compressor operates, high pressure is applied to the lubricating oil 20 within the oil reservoir 21. On the other hand, the opposite ends of each of the radial plain bearings 8a and 8b on the suction side, the upper ends of the respective radial plain bearings 9a and 9b, and a space within the cover casing 16 serving as a drain oil chamber 16a communicate with the suction side of the rotors and are maintained at a pressure lower than that within the high-pressure casing 19. The lubricating oil 21 within the oil reservoir 20 is delivered to these bearings by a differential pressure between the discharge pressure and the suction pressure of the gas. The lubricating oil is fed to the radial plain bearings 8a and 8b on the suction side through the feed-oil bore 17a, and to the hydraulic pressure chambers 17c and 17d through the feed-oil bore 17b. The lubricating oil fed to each of the hydraulic pressure chambers 17c and 17d flows in part to a corresponding one of the thrust plain bearings, while the remaining lubricating oil flows to a corresponding one of the radial plain bearings 9a and 9b on the discharge side. The lubricating oil flowing to each thrust plain bearing lubricates a bearing face of a corresponding one of the stationary bearing elements 10a and 10b and a bearing face of a corresponding one of the runners 11a and 11b. Subsequently, the lubricating oil is discharged into the drain oil chamber 16a.

Figure 3:
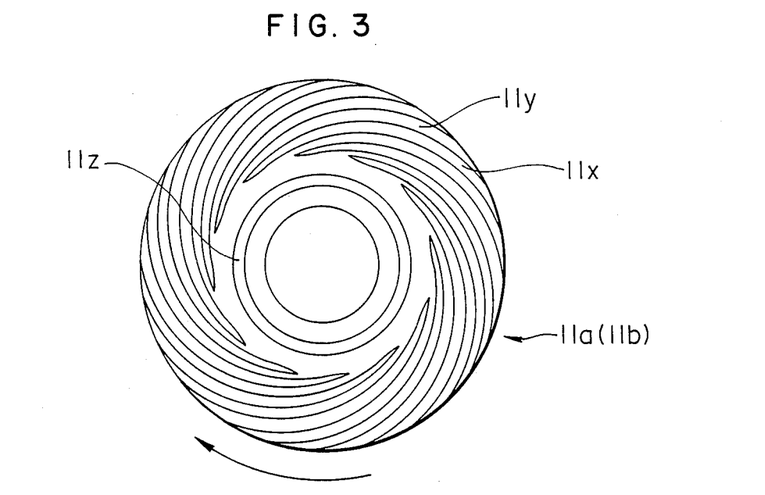
FIG. 3 is a plain view of a runner of one of the thrust plain bearings illustrated in FIG. 2.

The thrust plain bearings employed in the invention are of dynamic pressure type. In the illustrated embodiment, each of the runners of the respective thrust plain bearings is formed with spiral grooves. Specifically, as shown in FIG. 3, each runner 11a, 11b has an end face in contact with a corresponding one of the stationary bearing elements 10a and 10b, which end face is provided with a plurality of spiral grooves 11x each having a predetermined depth, with a land 11y left between each pair of adjacent grooves. The spiral grooves 11x extend from a central portion of the runner to the periphery thereof along the rotational direction of the runner indicated by the arrow in FIG. 3. Further, each runner 11a, 11b is formed at its central portion with an annular oil groove 11z. On the other hand, each stationary bearing element 10a, 10b has the bearing face which is formed smoothly.

During operation of the screw compressor, the lubricating oil fed through the feed-oil bore 17b and the hydraulic pressure chambers 17c and 17d reaches the bearing faces of the respective thrust plain bearings through annular gaps defined respectively between the through bores in the respective stationary bearing elements and the rotor shafts. The lubricating oil tending to flow out of the bearing face of each of the thrust plain bearings is confined in the spiral grooves 11x of a corresponding one of the runners 11a and 11b with rotation of the latter. As a result, dynamic pressure is generated in the lubricating oil within each thrust plain bearing due to the spiral grooves 11x of a corresponding one of the runners, so that the runner is floated away from a corresponding one of the stationary bearing elements by the oil film of high pressure against the upward axial force acting upon a corresponding one of the rotors. In this manner, the lubricating oil having lubricated the thrust plain bearings is discharged into the drain oil chamber 16b, but the discharged oil is extremely small in amount. This is because the dynamic pressure generated by the spiral grooves 11x serves as a resistance to hinder flow of the lubricating oil. For this reason, a high load capacity is produced in each bearing.

Referring to FIG. 2, since the high flow resistance is caused at the thrust plain bearings as described above, almost all of the lubricating oil supplied to the hydraulic pressure chambers 17c and 17d flow toward the upper radial plain bearings 9a and 9b to lubricate their respective bearing faces. Subsequently, the lubricating oil discharged through the upper ends of the respective radial plain bearings 9a and 9b. The lubricating oil passes through a guide bore (not shown) and is finally returned to the oil reservoir 21 through the space on the suction side. In this manner, the lubricating oil having lubricated the radial plain bearings 9a and 9b is recirculated without staying.

Figure 4:
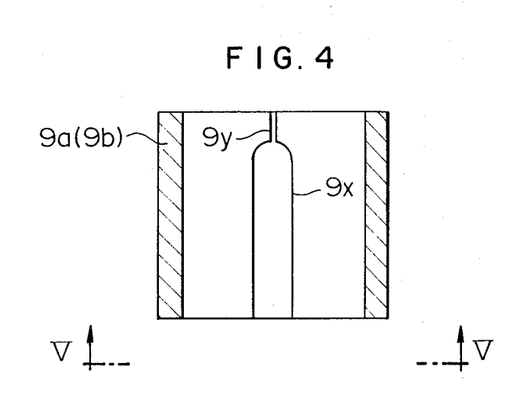
FIG. 4 is a longitudinal cross-sectional view of a radial plain bearing employed on the discharge side in the embodiment illustrated in FIG. 1.
Figure 5:
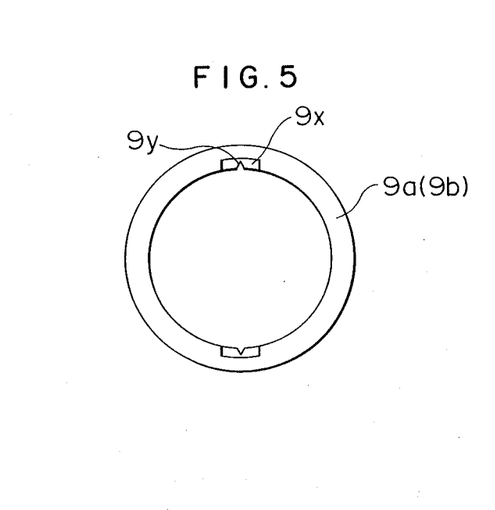
FIG. 5 is an end view of the radial plain bearing as viewed from the line V—V in FIG. 4.

As shown in FIGS. 4 and 5, each of the radial plain bearings 9a and 9b on the discharge side is provided in its bearing face with an axial groove. The axial groove is composed of a relatively wide groove section 9x and a relatively narrow groove section 9y which is located on the rotor side. The narrow groove section 9y serves as a resistance to flow of the lubricating oil lubricating the radial plain bearing 9a, 9b, so that the lubricating oil passing through the narrow oil groove 9y experience a pressure drop. Although the amount of oil lubricating the radial plain bearing 9a, 9b is rich as described above, provision of the narrow oil groove 9y shown in FIG. 4 makes it possible to improve the load capacity.

Figure 6:
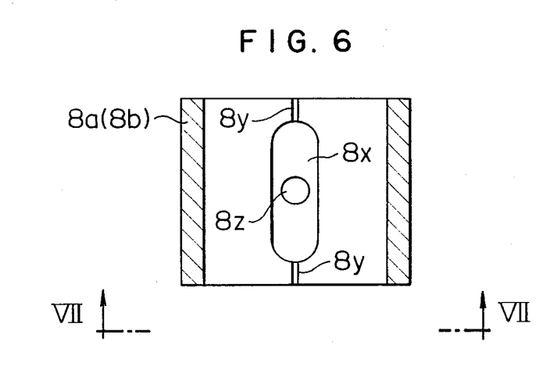
FIG. 6 is a longitudinal cross-sectional view of a radial plain bearing employed on the suction side in the embodiment illustrated in FIG. 1.
Figure 7:
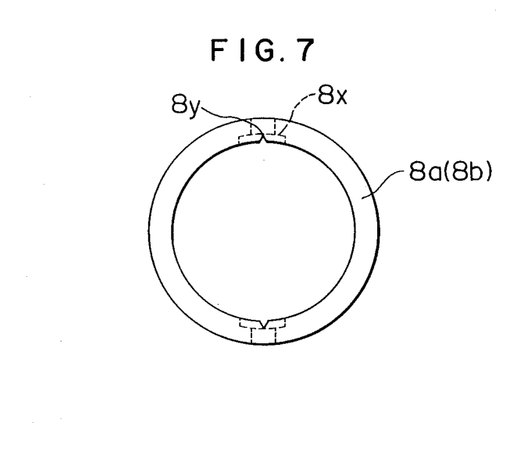
FIG. 7 is an end view of the radial plain bearing as viewed from the line VII—VII in FIG. 6.

Each of the radial plain bearings 8a and 8b on the suction side is also formed in its bearing face with an axial groove, as shown in FIGS. 6 and 7. Since the pressure around the radial plain bearings 8a and 8b on the suction side is the low suction pressure and has a uniform pressure distribution, a superior lubricating condition is obtained if the oil is fed to an axially central portion of the bearing face of each of the radial plain bearings. Further, the oil having lubricated the radial plain bearings 8a and 8b is easy to flow out because the surrounding pressure is low, so that there is a tendency that the lubricating oil fed is excessive in amount. Accordingly, the axial groove of each radial plain bearing is composed of a pair of relatively narrow groove sections 8y and 8y provided respectively at the opposite axial ends of the bearing face and a relatively wide groove section 8x connecting the narrow groove sections to each other. A feed-oil bore 8z is provided in the vicinity of the axial center of the groove section 8x. Each narrow groove section 8y has a cross-sectional configuration which is narrower than the narrow groove section 9y formed in the bearing face of each radial plain bearing on the discharge side, in order to prevent the lubricating oil fed to the radial plain bearings on the suction side from becoming excessive in amount. This is because the radial plain bearings 8a and 8b on the suction side are lower in bearing load than the radial plain bearings 9a and 9b on the discharge side so that the radial plain bearings 8a and 8b on the suction side can be lubricated with a less amount of oil. Moreover, the reason for the above is that if an excessive amount of lubricating oil flow to the radial plain bearings 8a and 8b, the lubricating oil fed to the radial plain bearings 9a and 9b on the discharge side is reduced in amount so that there is an anxiety causing seizing-up of the latter plain bearings which require the high load capacity.

The differential-pressure oil supply system is high in reliability and compact in size, because an external oil supply source such as a pump or the like is dispensed with. However, the differential-pressure oil supply system is restricted by an oil supply amount. According to the invention, the thrust plain bearings, which are most severe in operating condition of the screw compressor, can be lubricated with a small feed amount of oil, so that it is possible for various bearings different in rotational condition from each other, to be efficiently lubricated with the restricted total feed amount of oil in the differential-pressure oil supply system.

It is to be understood that the invention is not limited in application only to the screw compressor of differential-pressure oil supply system. That is, the invention can secure superior lubrication of bearings due to adequate distribution of lubricating oil, even in a compressor of powered oil supply system by a pump or the like. It will also be understood that other various modifications can be made to the invention within the scope of the appended claims.

Figure 8:
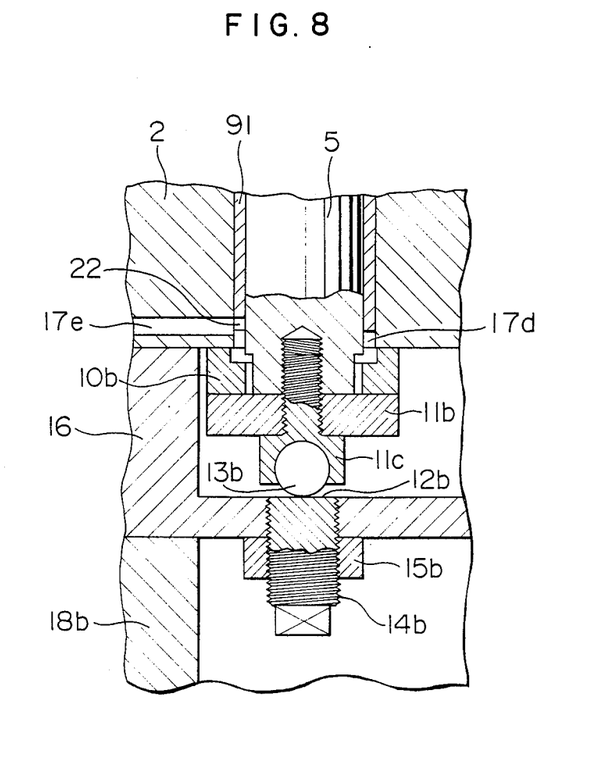
FIG. 8 is an enlarged cross-sectional view of a principal portion of a screw compressor according to another embodiment of the invention.

FIG. 8 shows a principal portion of a screw compressor according to another embodiment of the invention. In the embodiment, a radial plain bearing 91 on the discharge side is formed with a cut-out 22 at an end of a bearing face of the bearing 91 on the side of the hydraulic pressure chamber 17d. Further, the feed-oil bore 17e communicates with the cut-out 22 so that the lubricating oil is fed from the cut-off 22. Other construction and operation of the embodiment illustrated in FIG. 8 are similar to those of the afore-mentioned embodiment. Like or similar component parts are designated by the same reference numerals, and the description of such similar component parts will therefore be omitted. According to the embodiment illustrated in FIG. 8, it is easy to process the feed-oil bore, making it possible to reduce the flow passage resistance of the feed-oil bore.

If the radial plain bearings on the discharge side are replaced by bearings of a dynamic pressure type, the load capacity of the bearings increases like the thrust plain bearings of the invention. This makes it possible to reduce a consumptive amount of the lubricating oil.

As described above, according to the invention, the lubricant is divided into two flows which respectively lubricate the radial plain bearings on the discharge side and the thrust plain bearings. Since the thrust plain bearings are of dynamic pressure type, it is possible to prevent seizing of the thrust plain bearings even if an amount of lubricating oil fed to the bearings is small. Further, since the radial plain bearings are lubricated by the remaining rich amount of oil, the radial plain bearings are prevented from seizing under the wide range of operating conditions of the screw compressor, making it possible to obtain its stable function or operation. Thus, there are obtained such advantages that the entire bearings in the screw compressor can be made compact in size, and can have their respective semipermanent service lives extended.

What is claimed is:

1. In a screw compressor including a casing, a pair of male and female rotors respectively formed in outer peripheries thereof with helical teeth and grooves, said male and female rotors being arranged within said casing in meshing relation to each other through said teeth and grooves for compressing gas at a mating section between said male and female rotors, two pairs of first and second radial plain bearing means are provided for respectively supporting shafts of said male and female rotors, a pair of thrust plain bearing means are provided adjacent said second radial bearing means for the respective shafts, for supporting respectively one ends of the shafts of the male and female rotors, each of said thrust plain bearing means being of dynamic-pressure type in which with rotation of a corresponding one of the shafts of the male and female rotors, pressure is applied to lubricant at a sliding section of the thrust plain bearing means to produce an anti-thrust force, and the lubricant is fed to each of said first radial plain bearing means for the respective shafts, and is fed to a space between an end of a sliding section of each of said second radial plain bearing means and an adjacent end of the sliding section of a corresponding one of said thrust plain bearing means so that the lubricant is distributed to the second radial plain bearing means and the thrust plain bearing means to lubricate these bearing means in proportion to a difference between flow resistance with which the lubricant passes through the second radial plain bearing means and flow resistance with which the lubricant passes through the thrust plain bearing means.

2. A screw compressor according to claim 1, wherein the lubricant is fed to a vicinity of the end of the sliding section of each of said second radial plain bearing means.

3. A screw compressor according to claim 2, wherein the lubricant is supplied through at least one cut-out provided in an end of a bearing face of each of said second radial plain bearing means.

4. A screw compressor according to claim 1, wherein each of said thrust plain bearing means includes a runner fixedly mounted to an end of the shaft of a corresponding one of said rotors, and a stationary bearing element mounted on said casing in facing relation to the runner, the stationary bearing element being provided therein with a through bore through which the shaft of the rotor extends, and wherein the lubricant is supplied to the sliding section of each of said thrust plain bearing means through an annular gap between the through bore in the stationary bearing element and the shafts of a corresponding one of said rotors.

5. A screw compressor according to claim 1, wherein each of said second radial plain bearing means has a bearing face provided with at least one axial groove composed of a relatively narrow section and a relatively wide section, said narrow section being arranged on a side remote from a corresponding one of said thrust plain bearing means.

6. A screw compressor according to claim 5, wherein each of said first radial plain bearing means has a bearing face provided with at least one axial groove, the axial groove being composed of a central section and a pair of end sections arranged respectively at opposite ends of the central section, each of the end sections being narrower in width than the central section and being narrower in width than the narrow section of the groove formed in a corresponding one of said second radial plain bearing means, the central section being provided with a feed-lubricant bore for feeding the lubricant to the first radial plain bearing means.

7. A screw compressor according to claim 1, wherein an end of each of said radial plain bearing means and thrust plain bearing means on the side opposite to a portion thereof at which the lubricant is supplied, is maintained at a pressure lower than a discharge pressure to enhance flow of the lubricant.

8. A screw compressor comprising a casing; a pair of male and female rotors accommodated in said casing, said male and female rotors respectively having helical teeth and grooves formed in outer peripheries thereof, said male and female rotors being arranged in meshing relation to each other through said teeth and grooves; two pairs of first and second radial plain bearing means for respectively supporting shafts of said male and female rotors; a pair of thrust plain bearing means provided adjacent the respective second radial plain bearing means for rotatably supporting respectively one ends of the shafts of the male and female rotors, each of said thrust plain bearing means including a runner fixedly mounted to the one end of the shaft of a corresponding one of said rotors and a stationary bearing element mounted on said casing in facing relation to the runner, each of said thrust plain bearing means being of dynamic pressure type in which with rotation of a corresponding one of the shafts of the male and female rotors, pressure is applied to lubricant between the runner and the stationary bearing element to produce an anti-thrust force; and means for feeding the lubricant to lubricate said first and second radial plain bearing means and said thrust plain bearing means, the lubricant being fed to a space between an end of a sliding section of each of said second radial plain bearing means and an adjacent end of a sliding section of a corresponding one of said thrust plain bearing means so that the lubricant is distributed to the second radial plain bearing means more in amount than that fed to the thrust plain bearing means in proportion to a difference between flow resistance with which the lubricant passes through the second radial plain bearing means and flow resistance with which the lubricant passes through the thrust plain bearing means.

9. A screw compressor according to claim 8, wherein the lubricant for each of said second radial plain bearing means and a corresponding one of said thrust plain bearing means is fed through at least one cut-out provided in an end of a bearing face of the second radial plain bearing means.

10. A screw compressor according to claim 8, wherein the stationary bearing element of each of said thrust plain bearing means is provided with a through bore through which the shaft of a corresponding one of said rotors extends, and wherein the lubricant is supplied to the sliding section of each of said thrust plain bearing means through an annular gap between the through bore in the stationary bearing element and the shaft of a corresponding one of said rotors.

11. A screw compressor according to claim 8, wherein an end of each of said radial plain bearing means and thrust bearing means on the side opposite to a portion thereof at which the lubricant is supplied, is maintained at a pressure lower than a discharge pressure to enhance flow of the lubricant.

12. A screw compressor comprising a casing; drive means arranged at an upper portion within said casing; male and female rotors having helical teeth and grooves respectively formed in outer peripheries thereof, said male and female rotors being arranged on one side of said drive means and within said casing in meshing relation to each other through said teeth and grooves, one of said male and female rotors being operatively connected to said drive means such that said male and female rotors are rotated to draw gas into a mating section between said male and female rotors to compress the gas; a suction inlet provided in said casing for introducing the gas to the mating section between said male and female rotors through said drive means; a discharge outlet provided in said casing for permitting the compressed gas to be discharged from the compressor; two pairs of first and second radial plain bearing means for respectively supporting shafts of said male and female rotors; a pair of thrust plain bearing means provided adjacent the respective second radial plain bearing means for rotatably supporting respectively one ends of the shafts of the male and female rotors, each of said thrust plain bearing means including a runner fixedly mounted to an end of the shaft of a corresponding one of said rotors and a stationary bearing element mounted on said casing in facing relation to the runner, each of said thrust plain bearing means being of dynamic-pressure type in which with rotation of a corresponding one of the shafts of the respective male and female rotors, pressure is applied to lubricant between the runner and the stationary bearing element to produce an anti-thrust force; lubricant reservoir means provided within said casing at a position below said male and female rotors for storing the lubricant, said lubricant reservoir means communicating with a discharge side of the mating section between said male and female rotors and being maintained at a discharge pressure of the gas; and passageway means provided within said casing for connecting said lubricant reservoir means to each of said first radial plain bearing means and to a space between each of said second radial plain bearing means and a corresponding one of said thrust plain bearing means, said passageway means connecting an end of each of said radial plain bearing means and thrust plain bearing means on the side opposite to a portion thereof communicating with said lubricant reservoir means to a suction side of the mating section between said male and female rotors, thereby the lubricant within said lubricant reservoir means being supplied to each of said second radial plain bearing means and thrust plain bearing means due to a differential pressure between the discharge pressure and a suction pressure of the gas, the lubricant being distributed to each of said second radial plain bearing means more in amount than that fed to a corresponding one of said thrust plain bearing means in proportion to a difference between flow resistance with which the lubricant passes through the second radial plain bearing means and flow resistance with which the lubricant passes through the thrust plain bearing means.

* * * * *